(12) United States Patent
Grove et al.

(10) Patent No.: US 7,895,443 B2
(45) Date of Patent: *Feb. 22, 2011

(54) SECURE AUTHENTICATION USING HARDWARE TOKEN AND COMPUTER FINGERPRINT

(75) Inventors: Brian Grove, Laguna Niguel, CA (US); Reed H. Tibbetts, Tustin, CA (US); James Khalaf, Santa Ana, CA (US); Laszlo Elteto, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 2236 days.

This patent is subject to a terminal disclaimer.

(21) Appl. No.: 10/701,029

(22) Filed: Nov. 4, 2003

(65) Prior Publication Data

US 2004/0098585 A1    May 20, 2004

Related U.S. Application Data

(60) Provisional application No. 60/423,944, filed on Nov. 5, 2002.

(51) Int. Cl.
 H04L 9/00 (2006.01)
 H04L 9/32 (2006.01)
(52) U.S. Cl. .......... 713/182; 713/159; 713/185; 713/186; 726/20
(58) Field of Classification Search .......... 713/168, 713/185, 186, 182, 172; 380/278; 711/163, 711/164; 726/9, 20
See application file for complete search history.

(56) References Cited

U.S. PATENT DOCUMENTS

| | | | |
|---|---|---|---|
| 4,799,258 A | 1/1989 | Davies | |
| 5,212,729 A | 5/1993 | Schafer | |
| 5,225,664 A * | 7/1993 | Iijima | 235/380 |
| 5,386,369 A | 1/1995 | Christiano | |
| 5,664,950 A | 9/1997 | Lawrence | |
| 5,706,426 A | 1/1998 | Hsu | |
| 5,754,761 A | 5/1998 | Willsey | |
| 5,784,581 A | 7/1998 | Hannah | |
| 5,812,662 A | 9/1998 | Hsu et al. | |
| 5,815,577 A | 9/1998 | Clark | |
| 5,857,024 A | 1/1999 | Nishino et al. | |

(Continued)

FOREIGN PATENT DOCUMENTS

EP    0 587 375    3/1994

(Continued)

OTHER PUBLICATIONS

WIBU-Systems AG, "WIBU-KEY User's Guide Version 2.50", Jul. 1998, XP-002139265, Internet: URL:ftp://wwww2.wibu.de/pub/download/us/UG250US.pdf, pp. 12-14, 163-164.

(Continued)

*Primary Examiner*—Eleni A Shiferaw
(74) *Attorney, Agent, or Firm*—Drinker Biddle & Reath LLP

(57) ABSTRACT

A method and apparatus for secure authentication of a hardware token is disclosed. In one embodiment, a host computer fingerprint is used to generate a partial seed for a challenge-response authentication which is performed on the hardware token. In another embodiment, the host computer fingerprint is used as a personal identification number for the hardware token.

30 Claims, 6 Drawing Sheets

U.S. PATENT DOCUMENTS

| | | | |
|---|---|---|---|
| 5,870,080 | A | 2/1999 | Burnett et al. |
| 6,052,468 | A | 4/2000 | Hillhouse |
| 6,092,202 | A | 7/2000 | Veil et al. |
| 6,128,741 | A | 10/2000 | Goetz et al. |
| 6,189,099 | B1 | 2/2001 | Rallis et al. |
| 6,216,230 | B1 | 4/2001 | Rallis et al. |
| 6,317,836 | B1 | 11/2001 | Goren et al. |
| 6,401,205 | B1 * | 6/2002 | Rallis et al. ............... 713/172 |
| 6,425,084 | B1 * | 7/2002 | Rallis et al. ............... 713/185 |
| 6,434,700 | B1 | 8/2002 | Alonso et al. |
| 6,523,119 | B2 | 2/2003 | Pavlin et al. |
| 6,557,104 | B2 | 4/2003 | Vu et al. |
| 6,697,944 | B1 * | 2/2004 | Jones et al. ............... 713/168 |
| 6,715,078 | B1 * | 3/2004 | Chasko et al. ............ 713/193 |
| 6,952,775 | B1 * | 10/2005 | Miura ........................ 713/182 |
| 2001/0045451 | A1 * | 11/2001 | Tan et al. .................... 235/375 |
| 2003/0041244 | A1 * | 2/2003 | Buttyan et al. ............. 713/172 |
| 2003/0143989 | A1 * | 7/2003 | Ho et al. ..................... 455/418 |
| 2003/0208677 | A1 * | 11/2003 | Ayyagari et al. ........... 713/168 |
| 2007/0145125 | A1 * | 6/2007 | Caci et al. .................. 235/380 |

FOREIGN PATENT DOCUMENTS

| | | |
|---|---|---|
| EP | 0 791 877 A1 | 8/1997 |
| EP | 0 936 530 | 8/1999 |
| EP | 1 001 329 | 5/2000 |
| EP | 0 791 877 B1 | 5/2002 |
| GB | 2 154 344 | 9/1985 |
| WO | WO 00/23936 | 4/2000 |
| WO | WO 00/75755 | 12/2000 |

OTHER PUBLICATIONS

Rainbow Technologies, News Release, "Rainbow Technologies Adds USB Support for PC and Macintosh Software Developers to Sentinel Line," Nov. 17, 1998, XP002139273, Internet: http://www.rainbow.com/invest/PR981117b.html (2 pages).

"Universal Serial Bus (USB) Device Class Definition for Human Interface Devices (HID), Firmware Specification", Version 1.11, by the USB Implementer's Forum, Jun. 27, 2001; www.usb.org/developers/devclass_docs/HID1_11.pdf.

"Universal Serial Bus Device Class Definition for Audio Devices", Release 1.0, by the USB Implementer's Forum, Mar. 18, 1998; www.usb.org/developers/devclass_docs/audio10.pdf.

Cebit—Alladin Updates Hasp Remote Update System, Newsbytes, Mar. 15, 1995 (one page).

Rainbow's NetSwift iGate Closes the Door on Internet Bad Guys, Network Computing, 2002, n1316 p32 (three pages).

Mahabharat, India: PC Card Keeps Hackers At Bay, Newsbytes, Nov. 17, 1992 (one page).

Cone, Digital Locksmiths—Rainbow, Aladdin leads a rapidly growing and consolidating market, Informationweek 1995, n547 p82 (one page).

Aladdin Brings Security Hardware Dongle to iMac USB, Newsbytes, Nov. 16, 1998 (one page).

HASP Professional Software Protection, White papers 1 and 2, http://www.eladdin.com/hasp, pp. 1-7 and pp. 1-16.

Greenmeier, Oct. 24, 1997, MIDRANGE Systems, v10, n17, p13(1) (two pages).

Weston and Wehrmacher, http://www.itsecurity.com/asktecs/may901 (three pages).

Aladdin, Dec. 1997, http://web.archive.org/web/19980208082834/www.aks.com, six pages.

* cited by examiner

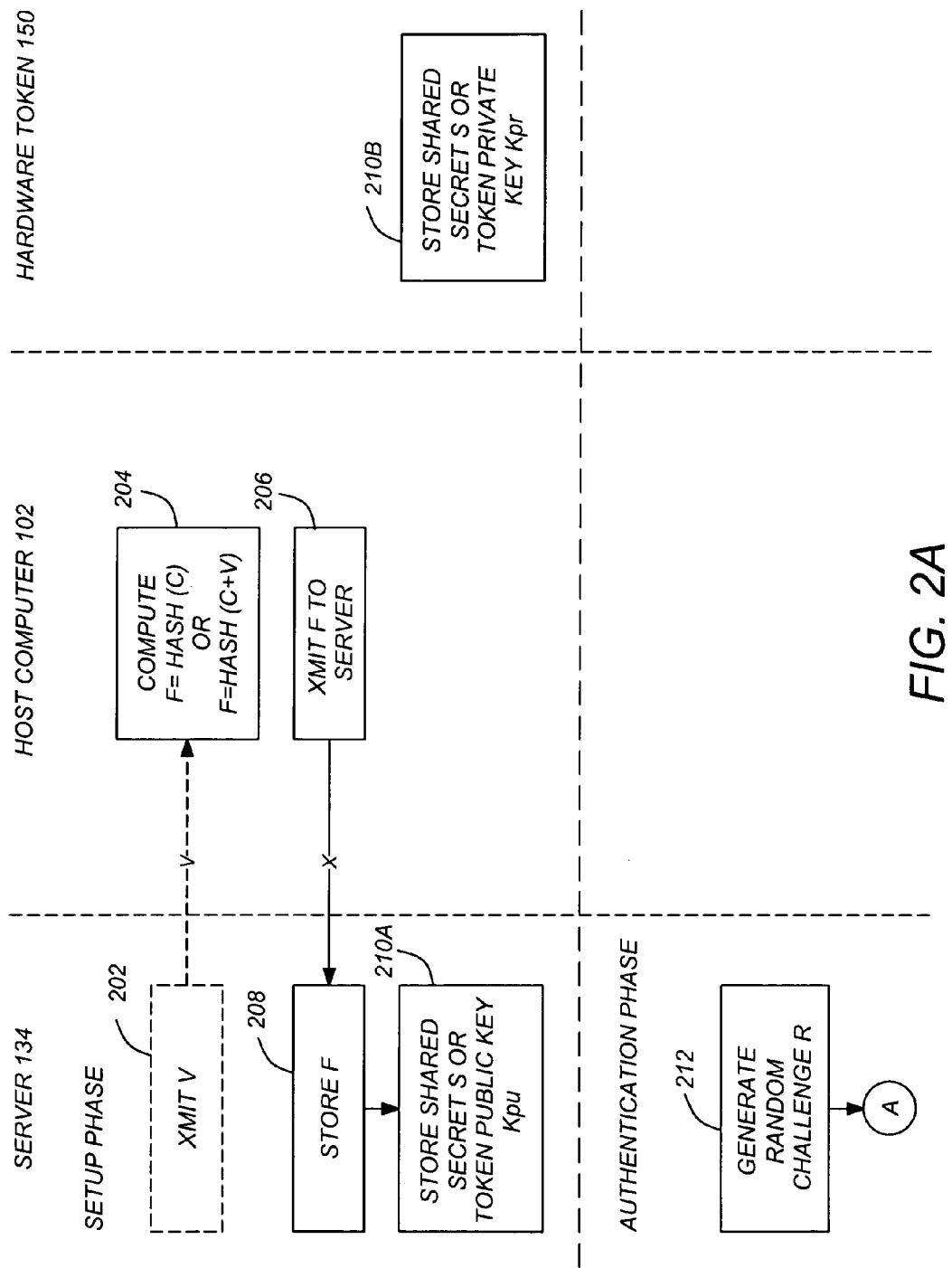

SECURE AUTHENTICATION USING HARDWARE TOKEN AND COMPUTER FINGERPRINT

CROSS-REFERENCE TO RELATED APPLICATIONS

This application claims benefit of U.S. Provisional Patent Application No. 60/423,944, entitled "SECURE AUTHENTICATION USING HARDWARE TOKEN AND COMPUTER FINGERPRINT," by Brian Grove, Reed H Tibbetts, James Khalaf, and Laszlo Elteto, filed Nov. 5, 2002, which application is hereby incorporated by reference herein.

This application is also related to U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-COMPLIANT PERSONAL KEY WITH INTEGRAL INPUT AND OUTPUT DEVICES," which is a continuation-in-part of U.S. patent application Ser. No. 09/281,017, filed Mar. 30, 1999 by Shawn D. Abbott, Bahram Afghani, Allan D. Anderson, Patrick N. Godding, Maarten G. Punt, and Mehdi Sotoodeh, and entitled "USB-COMPLIANT PERSONAL KEY," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-COMPLIANT PERSONAL KEY," all of which applications are hereby incorporated by reference herein.

BACKGROUND OF THE INVENTION

1. Field of the Invention

The present invention relates to the secure authentication of computer-interfaceable hardware tokens such as smartcards and USB tokens.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message.

Many methods have been developed to secure the integrity of electronic messages during transmission. Simple encryption is the most common method of securing data. Both secret key encryption such as DES Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use anyone of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Smartcards and other hardware tokens provide some of the above-mentioned functionality, but to prevent the unauthorized use of such tokens and the compromise of the information stored therein, there is a need to authenticate such tokens to assure that the possessor of the token is in fact the person entitled to use the token to access the computer.

Typically, hardware tokens require the user to enter a password such as a personal identification number (PIN) before using the card. A token may be designed or configured to be used without a PIN, but that poses a security threat as anybody in possession of a token (whether by finding a lost token or by theft) could use the token without restriction, potentially compromising the data stored therein and possibly using the token to access other computer systems. What is needed is a system and method for securely authenticating hardware tokens. The present invention satisfies that need.

SUMMARY OF THE INVENTION

To address the requirements described above, the present invention discloses a method and apparatus for secure authentication of a hardware token. In one embodiment, the method comprises the steps of generating a host fingerprint F; transmitting the fingerprint to an authorizing device such as a server or a host computer, receiving a challenge R' from the authorizing device, the challenge R' derived at least in part from the fingerprint F and a random number R; receiving a response X from the hardware token, the response X generated at least in part from the challenge R'; and transmitting the response X to the authorizing device. In another embodiment, the method comprises the steps of retrieving a value X from a memory accessible to an authenticating entity, the value X generated from a fingerprint F of the host and an identifier P securing access to the token; generating the identifier P at least in part from the value X and the fingerprint F; and transmitting the identifier P to the token.

BRIEF DESCRIPTION OF THE DRAWINGS

Referring now to the drawings in which like reference numbers represent corresponding parts throughout:

FIGS. 2A and 2B are process flow charts illustrating an embodiment of the present invention in which a host computer fingerprint is used to generate a partial seed for a challenge-response authentication performed on a hardware token;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
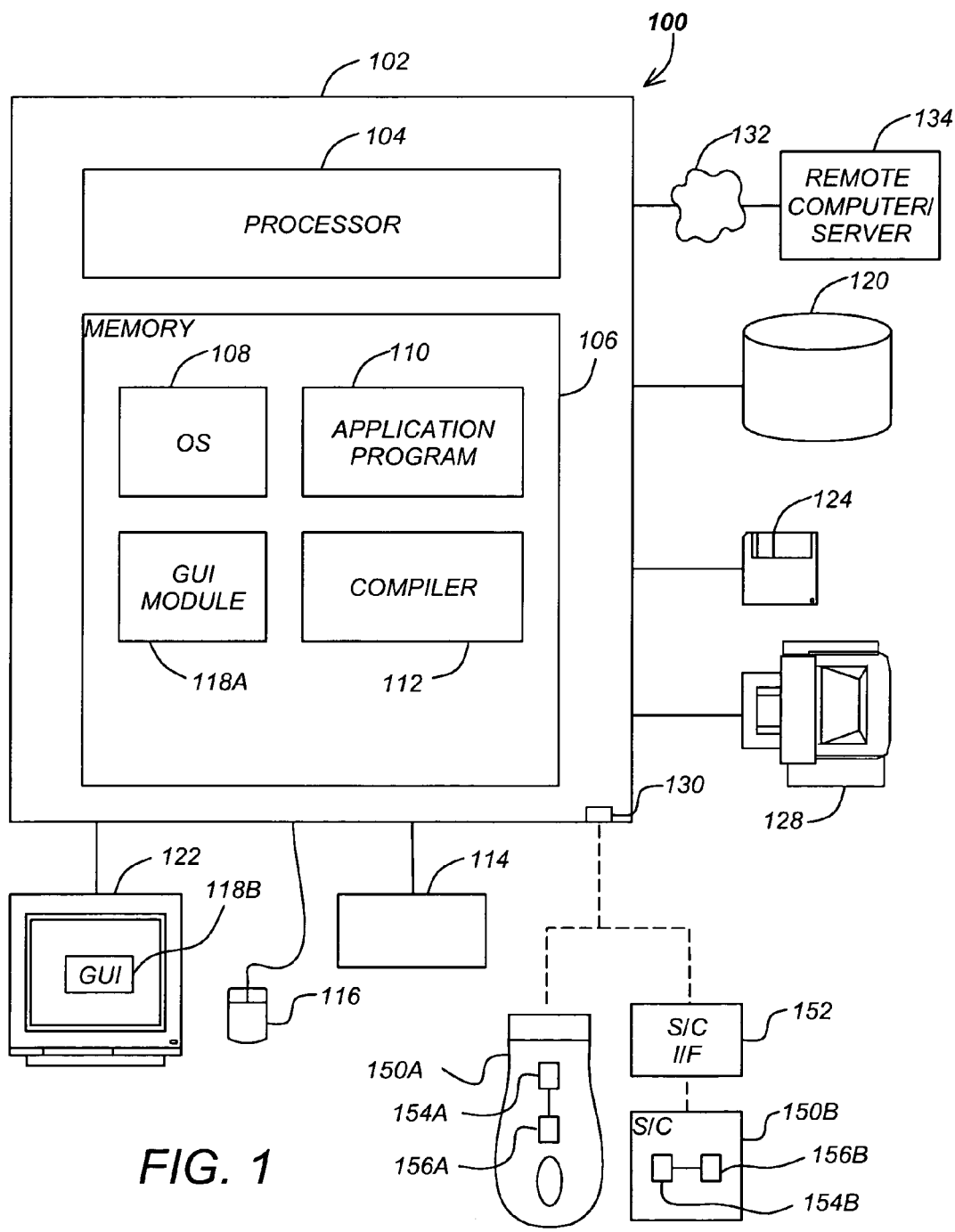
FIG. 1 is a diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130. The I/O port can be used to permit communications between the computer 102 and a hardware token 150. The hardware token can be a hardware key 150A such as the IKEY product available from RAINBOW TECHNOLOGIES, INC or a smartcard 150B. In one embodiment, the I/O port 130 is a USB-compliant port implementing a USB-compliant interface, and the hardware key 150A plugs directly into the I/O port 130. In another embodiment, the I/O port is a serial or USB port, and the smartcard 150B interfaces with the port via a smartcard interface (I/F) device 152. Whether the hardware token 150 is a hardware key 150A or a smartcard 150B, the hardware token 150 comprises a processor 154 (e.g. hardware key processor 154A or smartcard processor 154B) communicatively coupled to a memory 156 (e.g. hardware key memory 156A or smartcard memory 156B). The memory 156 stores instructions commanding the processor to perform the operations described herein. Some or all of such operations may also be performed by hardware modules or software modules having special purpose soft/firmware instructions stored in auxiliary memories as well.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network a wide area network (WAN, local area network (LAN), virtual private network (VPN or the Internet. Program instructions for computer operation, including additional or alternative application programs can be loaded from the remote computer/server 134. In one embodiment, the computer 102 implements an Internet browser, allowing the user to access the world wide web (WWW and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

FIG. 2A is a process flow chart illustrating one embodiment of the present invention. In this embodiment, a host computer fingerprint is used to generate a partial seed for a challenge-response authentication which is performed on the hardware token 150.

Setup Phase

Information regarding the host computer 102 is collected. This information can include, for example, the computer processor 104 serial and/or model number(s), the hard drive serial and/or model number(s), MAC address of a network interface card (a unique serial number burned into Ethernet and Token Ring adapters that identifies that network card from all others); Basic Input Output System (BIOS) code area checksum; OS type and/or version, or the system directory create timestamp. This information is used to generate a byte string C This can be accomplished, for example, by concatenating all or some of the collected information. This information is used to generate a host computer 102 fingerprint F, as shown in block 204. In one embodiment, the fingerprint F is simply the concatenation of all or some of the collected information. In another embodiment, the fingerprint F is a hash function (e.g. MD5 or SHA-1) applied to the collected information, or F=HASH (C). For privacy reasons, it may be desirable to generate a fingerprint F that can only be used by a particular server (e.g. service provider) 134. In this case, a server specific value V maybe provided by the server 134 and used to determine the fingerprint F. It is possible to use C+V as the computer fingerprint, however, this is not preferred because the value C+V may be quite lengthy, and would give out too much identifiable information about the computer 102 and/or the server 134. Hence, in the preferred embodiment, a hash function is applied to C+V, resulting in a fingerprint F=HASH(C+V). The fingerprint F is then transmitted to the server 134 where it is stored, as shown in blocks 206 and 208.

A secure means for transmitting information between the hardware token 150 and the server 134 is then established, as shown in blocks 210A and 210B. This can be accomplished by establishing a shared secret S between the server 134 and the token 150, and/or by a asymmetric key pair shared between the server 134 and the token 150. For example, the a private key $K_{pr}$ may be generated and stored in the token 150 and a corresponding public key $K_{pu}$ (e.g. in a certificate) be stored in the server 134.

Authentication Phase

Figure 2B:
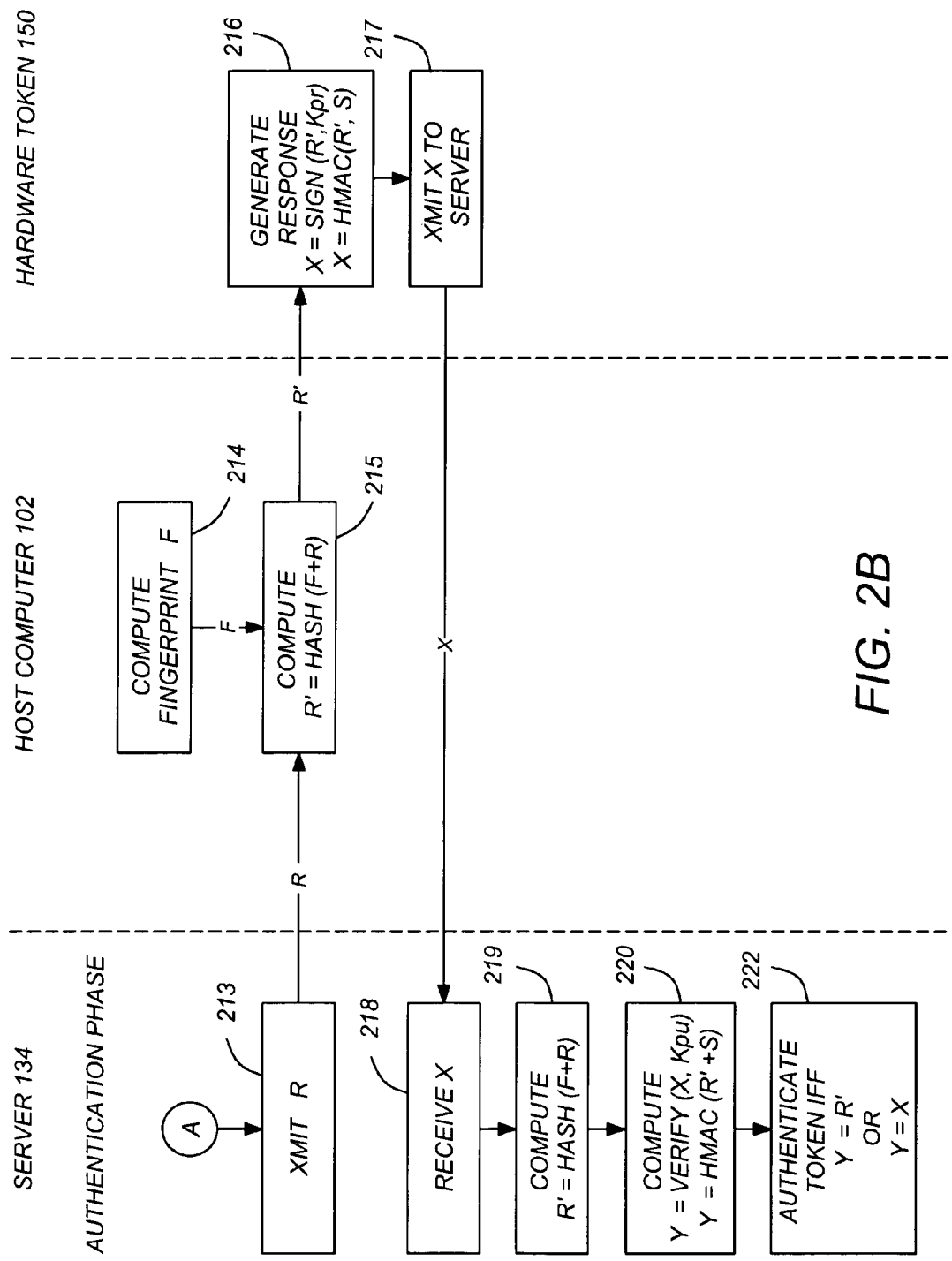

In the authentication phase, a challenge R is generated, as shown in block 212. In one embodiment, the challenge is a random (or pseudorandom) value R. Turning to FIG. 2B, the random value R is sent to the host computer 102 in step 213 and is combined with the fingerprint F to produce a host computer 102 unique challenge R', as shown in blocks 214 and 215. In the illustrated embodiment, R' is computed by the host computer 102 as a hash of a concatenation of the fingerprint F and the random challenge R. However, other methods of securely combining F and R can be used as well. For example, R' can be generated by simply concatenating F and R in a variety of ways.

The host computer-unique challenge R' is transmitted to the hardware token 150. The hardware token 150 receives the challenge R' and signs the challenge by generating a response X, as shown in block 216. If the token 150 and server 134 had established a secret S as the means for secure communications, the response X is generated using the shared secret, for example by determining a hash of the challenge and the shared secret, or X=HMAC(R', S) or an analogous secure combination. If the token 150 and the server 134 established a asymmetric, private and public key pair for such communications, the token 150 signs the challenge R' with its private key $K_{pr}$. The response X is then transmitted to the server 134, as shown in block 217. The server receives the response X, as shown in block 218. In block 219, the server 134 computes R'=HASH(F+R) from the stored fingerprint value F and the server-generated value of R.

If the received response X favorably compares to an expected response X', the token is authenticated. One technique of determining if the received response compares favorably with the expected response X' is to compare a regenerated version of R' to the version of R' that was signed by the token 150 and returned to the server 134 within the value X.

For example, since the server 134 shared either the secret S with the token 150 or received the public key of the token $K_{pu}$, the received value X can be processed to determine the received value R' (e.g. by computing Y'=VERIFY(X $K_{pu}$) or Y'=HMAC (R'+S)). Since the server 134 has access to the fingerprint F (it was stored in block 208) and because it generated the random challenge R, it can recall from memory or recompute the value for Y. If and only if the received value of R' (obtained from the value X received from the hardware token 150) favorably compares to the recalled or recomputed value of R', then the token 150 is authenticated. This is shown in blocks 219-222.

If additional security is desired (for example, to assure that the person in possession of the hardware token 150 is the intended possessor), it is possible to require user authentication before the token 150 generates the value X by signing the challenge R' as described in block 214, or before the token 150 transmits the value X to the server 134. This authentication can be in the form of a PIN entered into the hardware token 150 either directly, or through an interfacing device such as a smartcard I/F device 152.

Figure 3:
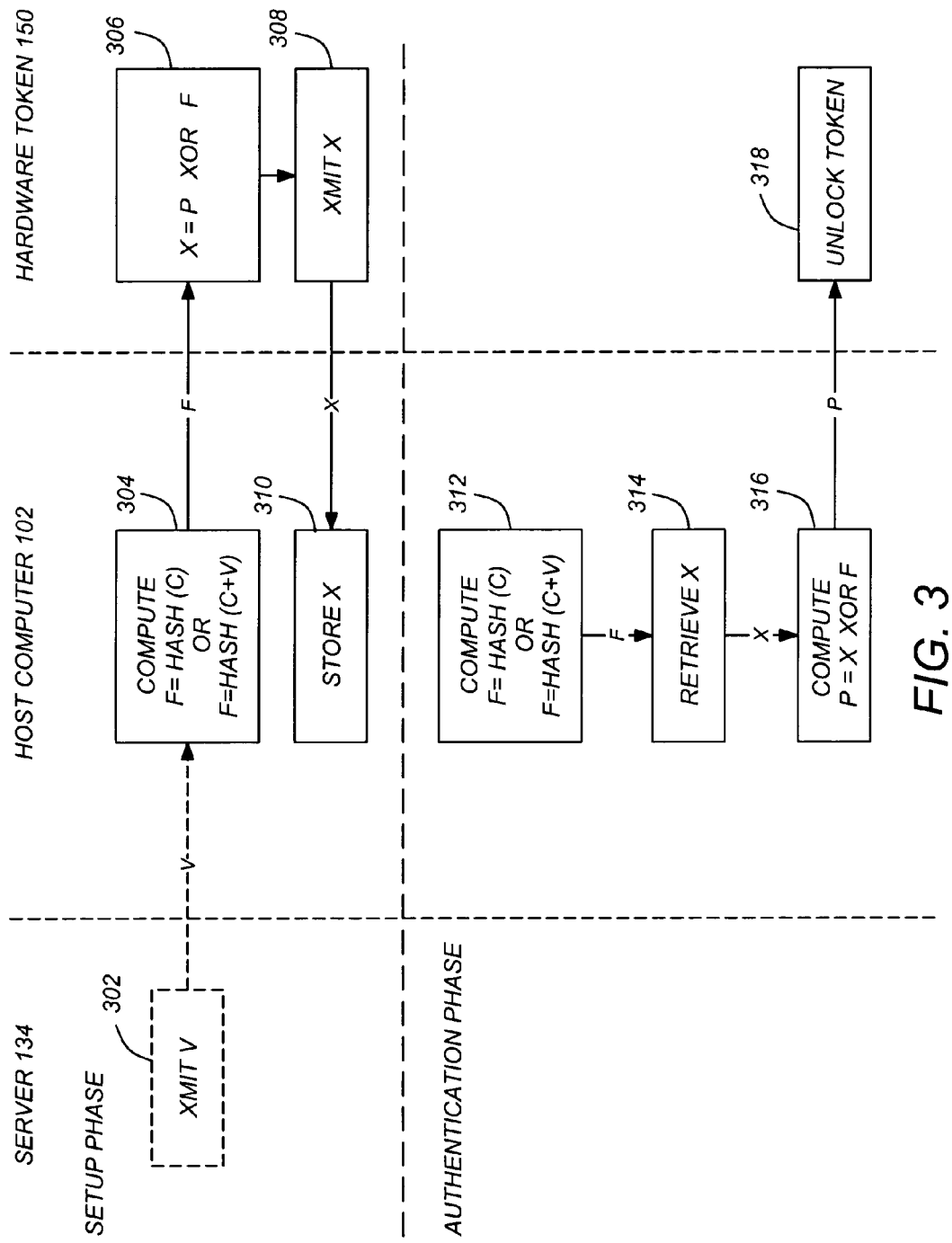
FIG. 3 is a process flow chart illustrating an embodiment of the invention wherein a host computer fingerprint is used as a personal identification number for the hardware token.

FIG. 3 is a process flow chart illustrating another embodiment of the present invention. In this embodiment, a host computer fingerprint is used as a personal identification number for the hardware token 150.

Setup Phase

Using techniques analogous to those discussed above, a fingerprint F of the host computer 102 is computed, as shown in block 304. The fingerprint F can be a hash of any combination of the computer parameters C described above, and may also include a server-specific value V, which is transmitted from the server 134 to the host computer 102 in block 302.

In a first embodiment, the token 150 is intended to be used at only the particular host computer 102 that generated the fingerprint F. In this embodiment, the token's 150 PIN is set to the fingerprint value F. Since the fingerprint is usually longer (e.g. more characters) than that which is allowed for a PIN, the first or last set of digits of the fingerprint's decimal representation can be used for the PIN.

However, if is desirable to use the token 150 with multiple computers, a derivative of the computer 102 fingerprint F and the token's PIN may instead be stored in the host computer 102 memory. In this embodiment, a value X is computed at least in part from the fingerprint F and the token's current PIN, P. This value is transmitted to and stored in the host computer 102, as shown in blocks 306-310. Preferably, X is computed from the fingerprint F and the token's current PIN P using a reversible function $f$. That is, $X=f(P,F)$, wherein $f(P,F)$ is a function such that $f(f(P,F),F)=P$. In the embodiment discussed above, the reversible function $f$ is an exclusive OR ("XOR") function.

Authentication Phase

When the token 150 is to be authenticated, the host computer 102 re-computes the fingerprint F, and retrieves the value X received from the token, as shown in blocks 312 and 314. For security reasons, the fingerprint F is preferably not stored in the host computer 102. The value X can be associated with the token 150 in a number of ways, including, for example, storing the value X with the token's serial number (which can be used later to retrieve the value X for a particular token 150). The host computer 102 then computes the hardware token's PIN P from the received and stored value X and the host computer's fingerprint F, as shown in block 316. In the preferred embodiment in which the value X was computed with a reversible function $f$, this can be accomplished by applying the function $f$ to the received value X and the fingerprint F. If the reversible function $f$ is the XOR function, this amounts to computing P=X XOR F. This computed PIN P is then transmitted to the hardware token 150, thus unlocking the token and making it available for use, as shown in block 318.

Figure 4A:
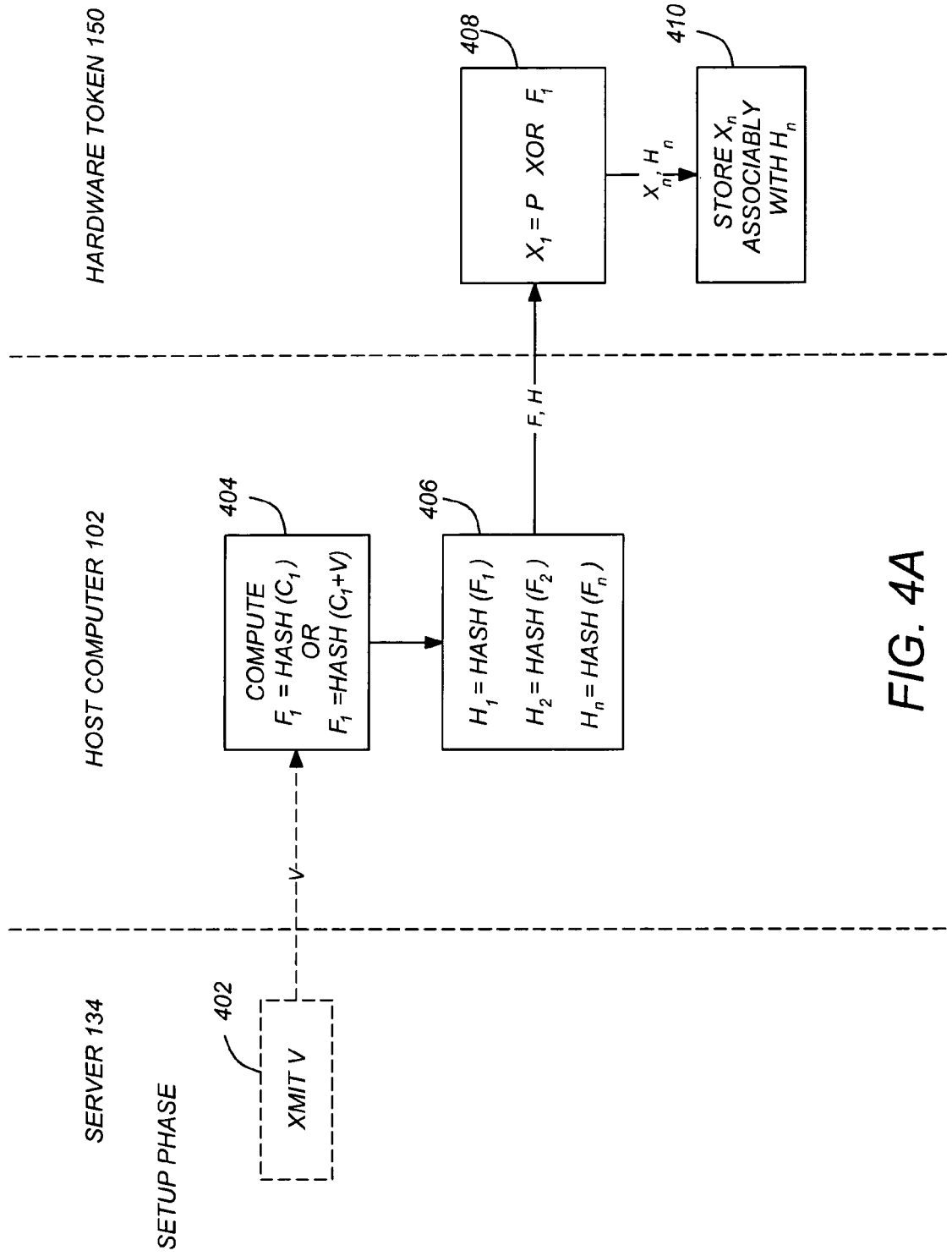
FIGS. 4A and 4B are diagrams showing one embodiment of a technique that uses the host computer fingerprint as a personal identification number for the token, and allows the token to be used with multiple computers.
Figure 4B:
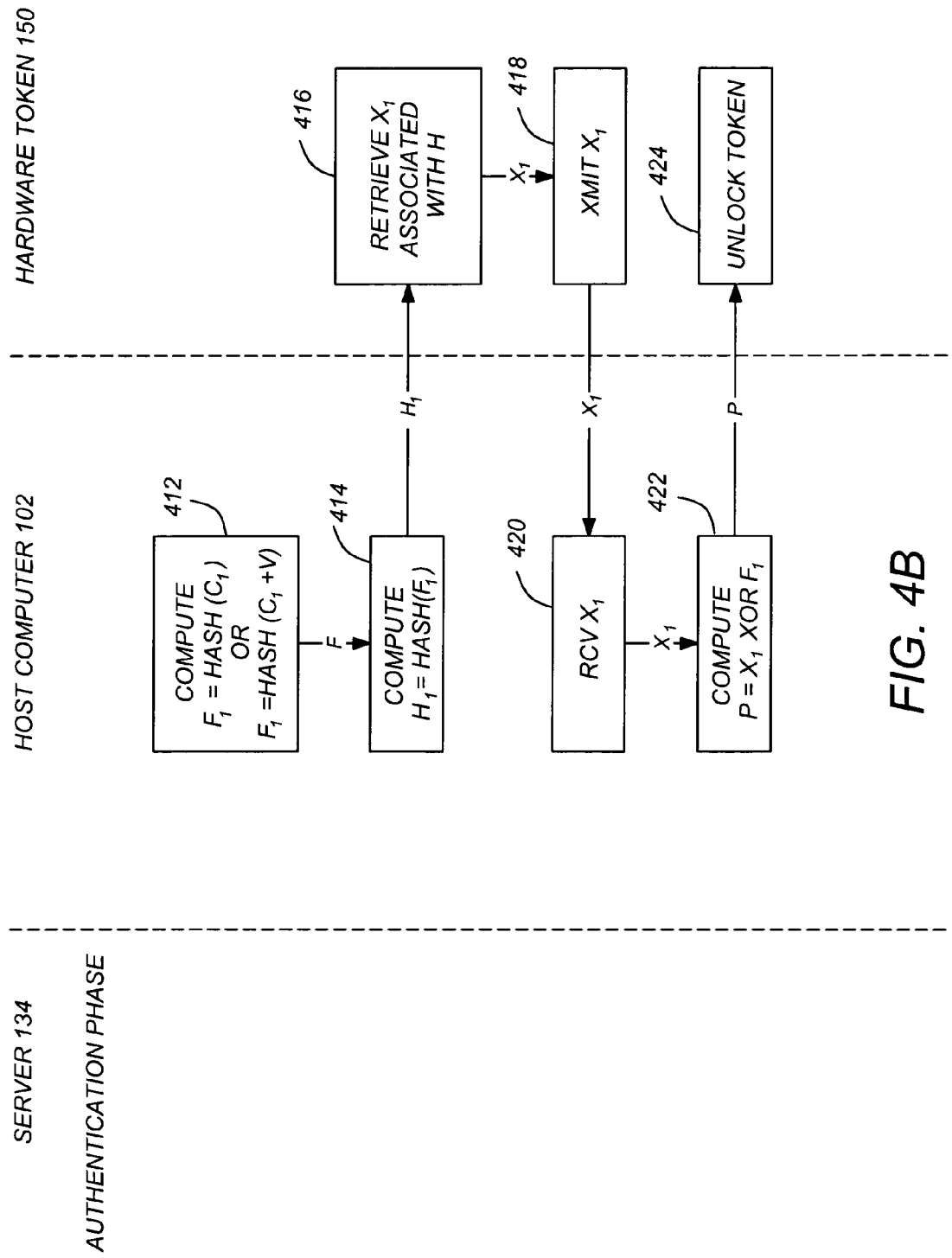

FIGS. 4A and 4B are diagrams showing one embodiment of a technique that can be used to authenticate the token in cases where the token 150 may be used with more than one host computer 102 or server. FIG. 4A illustrates the setup phase and FIG. 4B illustrates the authentication phase.

Turning first to FIG. 4A, multiple versions of the value X (e.g. $X_1, X_2, \ldots, X_n$), one for each host computer 102 that the hardware token 150 is to be used with are generated using the fingerprint $F_1, F_2, \ldots, F_n$ of the associated computer. The $X_1, X_2, \ldots, X_n$ values and $F_1, F_2, \ldots, F_n$ values are associably stored in the token 150 in such a way so as to allow them to be recalled as needed for use with each particular host computer 102. This is shown in blocks 406-410.

Although this may be accomplished by simply storing a table or a mapping relating $F_1, F_2, \ldots, F_n$ to $X_1, X_2, \ldots X_n$, for security reasons, it is preferable associate the values $X_1, X_2, \ldots, X_n$ with the values $F_1, F_2, \ldots, F_n$ without actually storing the values $F_1, F_2, \ldots, F_n$ in the token 150.

In one embodiment, this is accomplished by generating an index value $H_1, H_2, \ldots, H_n$ for each fingerprint $F_1, F_2, \ldots, F_n$, and associably storing the $X_1, X_2, \ldots, X_n$ and $H_1, H_2, \ldots, H_n$ values. The $H_1, H_2, \ldots, H_n$ values may be a HASH of $F_1, F_2, \ldots, F_n$ as follows $$H_1 = HASH(F_1)$$
$$H_2 = HASH(F_2)$$
$$\vdots$$
$$H_n = HASH(F_n)$$

In the embodiment illustrated in FIG. 4A, the indices $H_1, H_2, \ldots, H_n$ are computed in the host computer 102 and transmitted to the hardware token 150 along with the associated fingerprint values $F_1, F_2, \ldots, F_n$ as shown in blocks 404-406. The $X_1, X_2, \ldots, X_n$ values are then computed in the token 10 from the received fingerprint values $F_1, F_2, \ldots, F_n$, and associably stored with their related index values $H_1, H_2, \ldots, H_n$ as shown in blocks 408-410. In another embodiment, the fingerprint values $F_1, F_2, \ldots, F_n$ are transmitted to the hardware token 150, where the index values $H_1, H_2, \ldots, H_n$ are computed.

Alternatively, the index values $H_1, H_2, \ldots, H_n$ can be computed as a slightly different HASH from the original host computer 102 information $C_1$, for example, by combining (e.g. concatenating or hashing) the computer information $C_1$ with a fixed string Z. In this embodiment, the index values $H_i$ are computed by the host computer 102 and become $H_i = HASH(F_i + Z)$.

Turning now to the authentication phase shown in FIG. 4B, the host computer 102 computes the fingerprint F1, as shown in block 414. The host computer 102 then retrieves the X value corresponding to the fingerprint F. In the illustrated embodiment, this is accomplished by computing the index value $H_1$ from the fingerprint $F_1$ (e.g. by computing the hash of the fingerprint $F_1$), and transmitting the index value $H_1$ to the hardware token 150, as shown in block 414. The hardware token 150 then retrieves the value of $X_i$ associated with the received index value $H_1$ (in this case, $X_1$), and transmits this value to the host computer 102.

The host computer 102 receives the value $X_1$ from the hardware token 150, and uses it to compute the PIN value P required to unlock the hardware token 150. In the illustrated embodiment, the PIN value P computed applying the reversible XOR function to the received value of $X_1$ and the fingerprint F, as shown in block 422, and providing the PIN value P to the token 150 as shown in block 424. At this point, the token 150 can proceed with any further authentication procedures (e.g. user identification via biometric or password entry).

In cases where it is desirable to restrict the use of the token 150 to the host computer 102 as well as to a given person in possession of the token, a user password U can be incorporated into the above authentication technique. In the setup phase of this embodiment, the token prompts the user to select a password U which is different than the PIN of the token. This value of X described in FIGS. 4A and 4B is then computed as $X_i$=P XOR U XOR F. At authentication time, the user is again prompted to enter a password U. The password U is transmitted to the host computer along with the value for $X_1$, and the host computer 102 determines the PIN value P from P=X XOR U XOR F.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing has been described with respect to an implementation with a host computer 102 and a server 134 performing particular functions, the present invention may also be practiced with a single entity (e.g. a host computer 102 or a server 134) performing all server 134 and host computer 102 related functions.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of authenticating a hardware token for operation with a host, comprising:
   retrieving a value X from a memory separate from the hardware token, the memory accessible to an authenticating entity, the value X generated from a non-varying computer fingerprint F of a host and an identifier P securing access to the hardware token, wherein the fingerprint F is computed at least in part from non-varying host information C based on a unique characteristic of the host;
   regenerating the same identifier P at least in part from the value X and the fingerprint F; and
   transmitting the regenerated identifier P to the hardware token to authenticate the hardware token for operation with the host.

2. The method of claim 1, wherein the fingerprint F is computed at least in part from the host information C and a non-varying server specific value V.

3. The method of claim 2, wherein the fingerprint F is computed at least in part from the host information C, the non-varying server specific value V, and a non-varying string Z.

4. The method of claim 1, wherein the value X is computed in the hardware token.

5. The method of claim 1, wherein the value X is computed according to $X = f(P, F)$, wherein $f(P, F)$ is a reversible function such that $f(f(P, F), F) = P$.

6. The method of claim 5, wherein $f(P, F)$ comprises P XOR F.

7. The method of claim 1, wherein the value X is further computed at least in part from a user identifier U.

8. The method of claim 7, wherein the value X is computed according to $X = f(P, U, F)$, wherein $f(P, U, F)$ is a reversible function such that $f(f(P, U, F), U, F) = P$.

9. The method of claim 8, wherein $f(P, U, F)$ is P XOR U XOR F.

10. The method of claim 1, wherein:
    the authenticating entity is the host computer, communicatively coupleable to the hardware token; and
    the value X is stored in the host computer.

11. An apparatus for authenticating a hardware token for operation with a host, comprising:
    a memory separate from the hardware token, the memory accessible to an authenticating entity, the memory storing a value X, the value X generated from a non-varying computer fingerprint F of the host and an identifier P securing access to the hardware token, wherein the fingerprint F is computed at least in part from non-varying host information C based on a unique characteristic of the host;
    the host, adapted to:
      compute the fingerprint F,
      send the fingerprint F to the hardware token,
      receive the value X from the hardware token,
      store the value X in the memory,
      retrieve the value X from the memory,
      regenerate the same identifier P at least in part from the retrieved value X and the fingerprint F, and
      transmit the regenerated identifier P to the hardware token to authenticate the hardware token for operation with the host; and
    the hardware token, adapted to:
      receive the fingerprint F from the host,
      generate the value X from the fingerprint F and the identifier P,
      transmit the value X to the host for storage in the memory, and
      receive the regenerated value P from the host, whereby the hardware token is authenticated for operation with the host.

12. The apparatus of claim 11, wherein the fingerprint F is computed at least in part from the host information C and a non-varying server specific value V.

13. The apparatus of claim 12, wherein the fingerprint F is computed at least in part from the host information C, the non-varying server specific value V, and a non-varying string Z.

14. The apparatus of claim 11, wherein the value X is computed in the hardware token.

15. The apparatus of claim 11, wherein the value X is computed according to $X = f(P, F)$, wherein $f(P, F)$ is a reversible function such that $f(f(P, F), F) = P$.

16. The apparatus of claim 15, wherein $f(P, F)$ comprises P XOR F.

17. The apparatus of claim 11, wherein the value X is further computed at least in part from a user identifier U.

18. The apparatus of claim 17, wherein the value X is computed according to $X = f(P, U, F)$, wherein $f(P, U, F)$ is a reversible function such that $f(f(P, U, F), U, F) = P$.

19. The apparatus of claim 18, wherein $f(P, U, F)$ is P XOR U XOR F.

20. The apparatus of claim 11, wherein:
    the authenticating entity is the host computer, communicatively coupleable to the hardware token; and
    the value X is stored in the host computer.

21. An apparatus for authenticating a hardware token for operation with a host, the apparatus comprising a processor and a computer readable storage medium storing instructions for performing steps comprising:
    retrieving a value X from a memory separate from the hardware token, the memory accessible to an authenticating entity, the value X generated from a non-varying computer fingerprint F of a host and an identifier P securing access to the hardware token, wherein the fingerprint F is computed at least in part from non-varying host information C based on a unique characteristic of the host;
    regenerating the same identifier P at least in part from the value X and the fingerprint F; and
    transmitting the regenerated identifier P to the hardware token to authenticate the hardware token for operation with the host.

22. The apparatus of claim 21, wherein the fingerprint F is computed at least in part from the host information C and a non-varying server specific value V.

23. The apparatus of claim 22, wherein the fingerprint F is computed at least in part from the host information C, the non-varying server specific value V, and a non-varying string Z.

24. The apparatus of claim 21, wherein the value X is computed in the hardware token.

25. The apparatus of claim 21, wherein the value X is computed according to $X = f(P, F)$, wherein $f(P, F)$ is a reversible function such that $f(f(P, F), F) = P$.

26. The apparatus of claim 25, wherein $f(P, F)$ comprises P XOR F.

27. The apparatus of claim 21, wherein the value X is further computed at least in part from a user identifier U.

28. The apparatus of claim 27, wherein the value X is computed according to X = f(P, U, F), wherein $f(P, U, F)$ is a reversible function such that $f(f(P, U, F), U, F) = P$.

29. The apparatus of claim 28, wherein $f(P, U, F)$ is P XOR U XOR F.

30. The apparatus of claim 21, wherein:

the authenticating entity is the host computer, communicatively coupleable to the hardware token; and the value X is stored in the host computer.

* * * * *